United States Patent [19]

Kamerman et al.

[11] Patent Number: 4,847,880
[45] Date of Patent: Jul. 11, 1989

[54] MULTIPOINT MODEM SYSTEM HAVING FAST SYNCHRONIZATION

[75] Inventors: Adriaan Kamerman, Nieuwegein, Netherlands; Timothy N. Doolittle, St. Paul, Minn.

[73] Assignee: NCR Corporation, Dayton, Ohio

[21] Appl. No.: 234,068

[22] Filed: Aug. 18, 1988

[30] Foreign Application Priority Data

Jan. 13, 1988 [GB] United Kingdom ............... 8800739

[51] Int. Cl.$^4$ ............................ H04B 1/38; H04L 7/10
[52] U.S. Cl. .......................................... 375/8; 375/13; 375/103; 375/106; 375/111; 364/724.10
[58] Field of Search ................ 375/8, 13, 11, 12, 103, 375/106, 111, 118, 119; 333/18; 364/724.10

[56] References Cited

U.S. PATENT DOCUMENTS

| | | | |
|---|---|---|---|
| 4,273,955 | 6/1981 | Armstrong | 178/696 |
| 4,301,417 | 11/1981 | Jansen et al. | 329/50 |
| 4,362,997 | 12/1982 | van Driest | 329/50 |
| 4,453,259 | 6/1984 | Miller | 375/106 |
| 4,528,519 | 7/1985 | van Driest | 330/279 |
| 4,530,104 | 7/1985 | Kamerman | 375/14 |
| 4,577,334 | 3/1986 | Boer et al. | 375/97 |
| 4,707,841 | 11/1987 | Yen et al. | 375/118 |
| 4,817,114 | 3/1989 | Boer | 375/8 |

FOREIGN PATENT DOCUMENTS

| | | |
|---|---|---|
| 0169548 | 7/1985 | European Pat. Off. . |
| 0180066 | 7/1985 | European Pat. Off. . |
| 0173569 | 8/1985 | European Pat. Off. . |
| 0185332 | 12/1985 | European Pat. Off. . |
| 0204308 | 6/1986 | European Pat. Off. . |
| 2175480 | 5/1985 | United Kingdom . |
| 2174274 | 10/1985 | United Kingdom . |

OTHER PUBLICATIONS

Bennett, W. R. and Davey, J. R.; Data Transmission; McGraw-Hill, New York, 1965; pp. 182–190.
Lucky, R. W. Salz, Jr. and Weldon, E. J.; Principles of Data Communication; McGraw-Hill, New York 1968; pp. 226–232.
Bird, J. S.; Error performance of binary NCFSK in the presence of multiple tone interference and system noise: IEEE Transaction on Communications, vol. COM-33, No. 3, Mar. 1985; pp. 203–209.
Sundberg, C. E.; Continuous phase modulation; IEEE Communications Magazine, vol. 24, No. 4, Apr. 1986; pp. 25–38.
Ansari, R. and Liu, B.; A class of low noise computationally efficient recursive digital filters; proceedings IEEE International Symposium Circuits and Systems, Apr. 1981; pp. 550–553.
Ansari, R. and Liu, B.; A class of low noise computionally efficient recursive digital filters with applications to sampling rate alterations; IEEE Transactions on Acoustics, Speech & Signal Processing, vol. ASSP-33, No. 1, 2/85.
Jennings, F.; Practical data communications–modems, networks, protocols; Blackwell Scientific Publications, Oxford 1986, p. 48.

(List continued on next page.)

Primary Examiner—Robert L. Griffin
Assistant Examiner—Marianne Huseman
Attorney, Agent, or Firm—Wilbert Hawk, Jr.; ALbert L. Sessler, Jr.; Richard W. Lavin

[57] ABSTRACT

A multipoint data modem communication system (10) includes a master modem (12) and a plurality of remote modems (14, 16 and 18). During an initial, remote-to-master transmission, a relatively long training sequence is transmitted and receiver parameter and equalizer coefficients are stored in a storage unit (156) in the master modem (12). During subsequent transmissions a relatively short training sequence which synchronizes the master modem receiver timing and also identifies the transmitting remote modem is applied. In the master modem an interpolation filter based on a ninth order Lagrange interpolation formula is located between an analog-to-digital converter (84) and a band-pass filter (92). Coefficients for the interpolation filter are calculated using a residual time shift value which is computed using a DFT calculator (96) which is coupled to a phase segment detector (142) and a phase-to-time-shift converter (146).

7 Claims, 7 Drawing Sheets

OTHER PUBLICATIONS

Godard, D. N.; Pass-band timing recovery in an all-digital modem receiver; IEEE Transactions on Communications, vol. COM-26, No. 5; May 1978.

Abramowitz, M., Stegun, J. A.; Handbook of mathematical functions; Dover Publications Inc., New York, 1972; formula 4.3.100, p. 76.

Idem Reference Abramowitz, M., Stegun, J. A.; formula 25.2.6, 25.2.7, p. 878.

CCITT-Data Communication over the telephone network—vol. VIII—Fascicle VIII.1—Recommendations of the V-Series; Geneva 1985, Recommendation V29; p. 203-215.

Carey, M. B., Chen, H. T.; Descloux, A., Ingle, J. F. and Clark K. I.; 1982/83 End office connection study-AT&T Bell Laboratories Technical Journal, vol. 63, No. 9, Nov. 1984; pp. 2059-2119.

Motorola Inc. 2605 Series Data User Manual, Aug. 1984, Motorola Inc., Mansfield, Massachusetts.

Racal Milgo's 14400 bit/s System Modem Omnimode 14.4 Manual.

MULTIPOINT MODEM SYSTEM HAVING FAST SYNCHRONIZATION

BACKGROUND OF THE INVENTION

1. Field of the Invention

This invention relates to multipoint data communication systems of the kind including a master modem and a plurality of remote modems, wherein said master modem includes a modem receiver including sampling means adapted to receive analog signals from a transmission line and including timing recovery means adapted to supply timing signals to said sampling means.

2. Description of the Prior Art

A multipoint data modem communication system of the kind specified is known from European Patent Application No. 0,169,548. In the known system, a master station polls several remote stations. The modem of the master station gives a continuous carrier signal. This signal is received by each remote modem. If the terminal identity contained in the poll does not match the identity of the remote station then the poll is ignored. A remote station that recognizes the poll responds by sending one of two types of "messages"; either the first block of its data or a character sequence indicating no data to send. A remote station must use switched carrier signal when sending its "message" by turning on "request to send" to its modem before transmission and turning it off after transmission.

Once a particular remote station becomes active, the master station modem must detect the carrier of the remote modem, extract the receiver timing signal, set internal gain parameters, and acquire equalizer values to compensate for the transmission path to the active modem.

Each modem communication channel has a separate and distinct path resulting in a different set of characteristics corresponding to attenuation, amplitude and delay distortion and phase impairments. Therefore the master station modem must compensate for each communication channel individually. Each remote-master communication channel requires the connected modem to send a training sequence to allow the master modem receiver to acquire the parameters required for reliable data transfer. For that purpose, the master modem acquires receiver operating parameters and equalizer coefficients during an initial training sequence, and stores the parameters and coefficients in a memory location allocated for the particular remote modem. The stored parameters include parameters for compensation of data timing clock offset and equalizer coefficients. At the beginning of a subsequent transmission the master modem receiver parameters and coefficients are loaded from values previously stored in the corresponding memory location. During subsequent transmissions from a remote modem, this modem is identified at the master modem by a time interval or by a set of frequencies. During short remote-master transmissions each training sequence occupies a significant part of the transmission time. During training for transmission at high data-rates such as 14,400 bits per second the receiver operating parameters have to achieve accurate settings to yield a high data reliability.

SUMMARY OF THE INVENTION

There is provided a multipoint data modem communication system having a master modem coupled over a transmission line to a plurality of remote modems including a modem receiver mounted in said master modem, sampling means mounted in said modem receiver adapted to receive analog signals from the transmission line, timing recovery means mounted in the modem receiver for supplying timing signals to said sampling means, interpolation filter means in said modem receiver having an input coupled to an output of said sampling means and an output coupled to an input of said timing recovery means and filter coefficient calculation means mounted in said modem receiver and adapted to calculate, in accordance with a predetermined interpolation formula, filter coefficients for said interpolation filter means during the reception by said receiver means of a training signal transmitted by one of said remote modems.

It is thus an object of the present invention to provide a data modem communication system of the kind specified wherein a fast and accurate synchronization of the master modem receiver can be achieved.

BRIEF DESCRIPTION OF THE DRAWINGS

Additional advantages and meritorious features of the present invention will be apparent from the following detailed description and appended claims when read in conjunction with the drawings wherein like numerals identify corresponding elements.

DESCRIPTION OF THE PREFERRED EMBODIMENT

Figure 1:
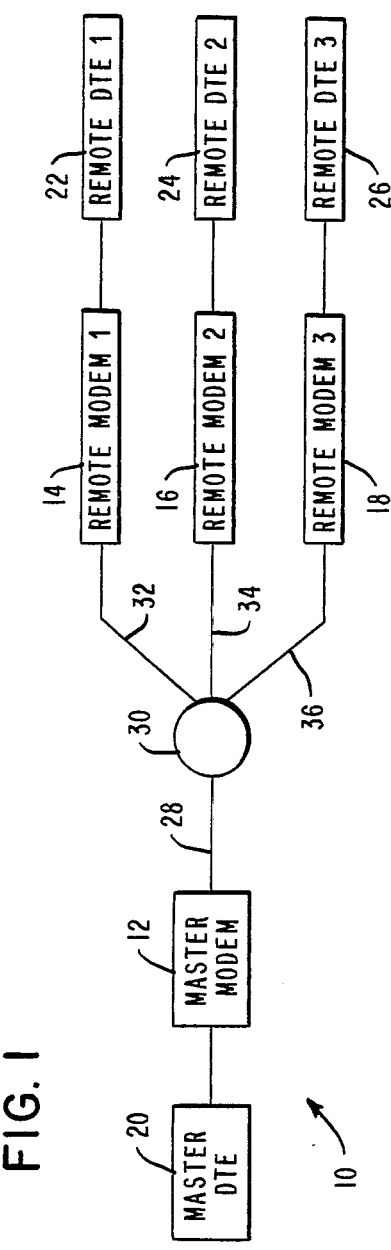
FIG. 1 is a block diagram of a data modem communication system including a master modem and a plurality of remote modems.

Referring now to FIG. 1, there is shown a multipoint data modem communication system 10 including a master modem 12 and three remote modems 14, 16 and 18. In practice, a greater or lesser number of remote modems may be employed. The master modem 12 is connected to a master data terminal equipment (DTE) unit 20 and the remote modems 14, 16 and 18 are connected to remote data terminal equipment (DTE) units 22, 24 and 26. The master modem 12 is connected over a 4-wire telephone transmission line 28 to a branch point 30 which is connected over 4-wire telephone transmission lines 32, 34 and 36 to the respective modems 14, 16 and 18. As is conventional, each of the 4-wire telephone transmission lines 28, 32, 34 and 36 includes a transmit pair of lines and a receive pair of lines.

Data is normally transmitted at a data bit rate of 14,400 bits per second, using a carrier frequency of 1800 Hz in accordance with CCITT Recommendation V.33 and using a modulation frequency of 2400 Hz (2400 Baud Symbol Rate). The modems operate with a sample clock frequency having a nominal value of 9600 Hz, that is, four times the modulation frequency.

Figure 2:
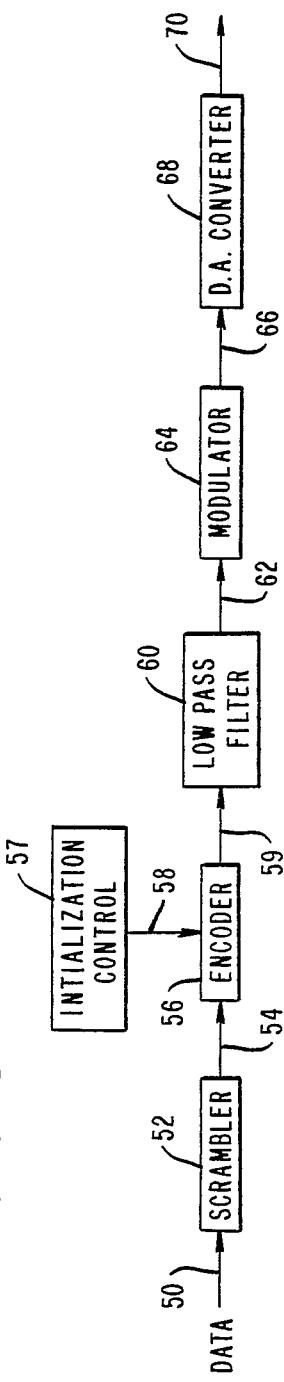
FIG. 2 is a block diagram of a remote modem transmitter.

Referring now to FIG. 2, there is shown a block diagram of the modem transmitter section of one of the modems 12, 14, 16 and 18 shown in FIG. 1. Digital signals from the associated data terminal equipment (DTE) are applied over an input line 50 to a scrambler 52. The output of the scrambler 52 is connected over a line 54 to an input of an encoder 56. An initialization control circuit 57 is also connected over a line 58 to the encoder 56. The initialization control circuit 57 enables the encoder 56 to provide training signals as will be described hereinafter. The output of the encoder 56 is connected over a line 59 to a low-pass filter 60 the output of which is connected over a line 62 to a modulator 64. The output of the modulator 64 is connected over line 66 to a digital-to-analog converter 68 which has an output line 70 connected to the associated telephone transmission line.

Figure 3:
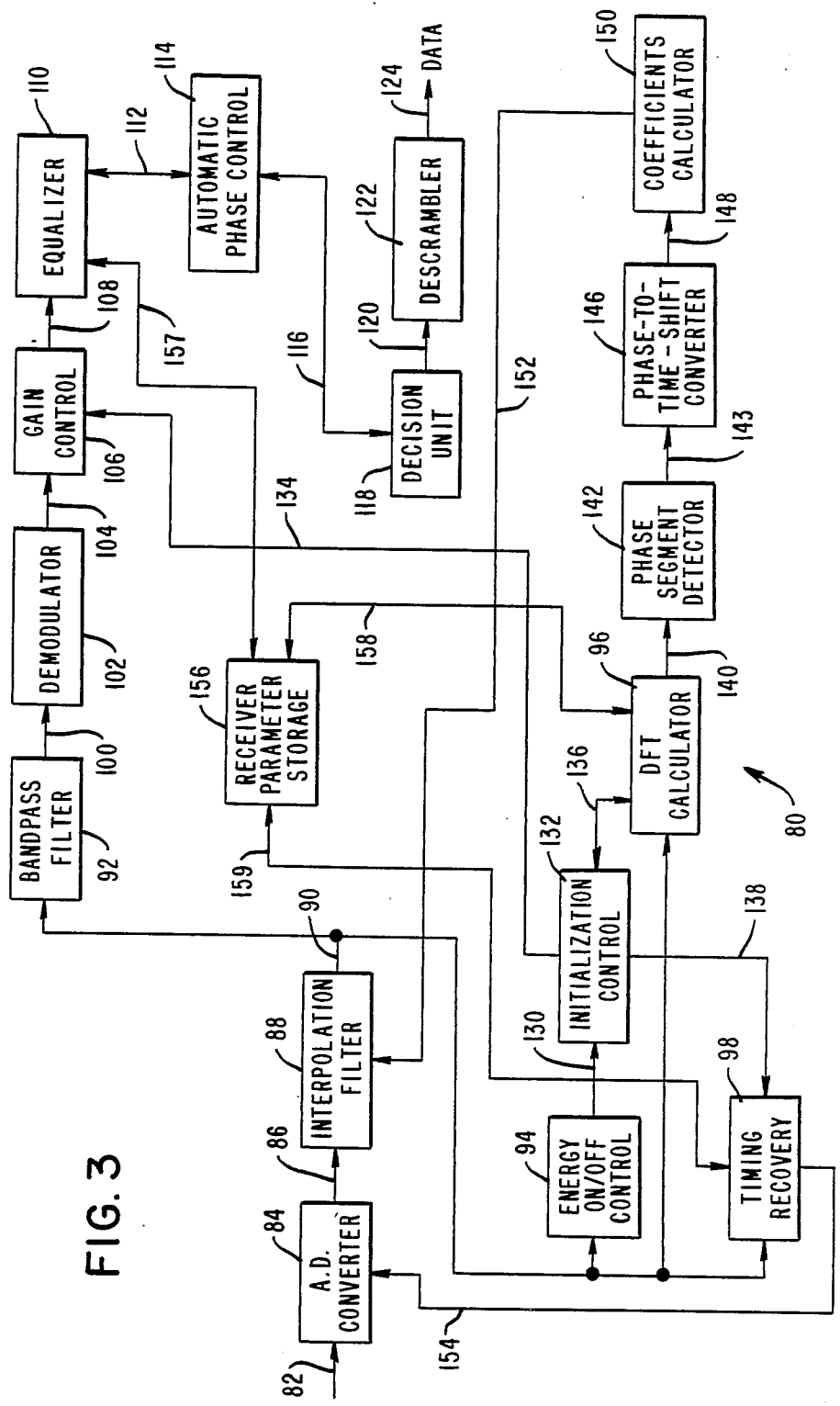
FIG. 3 is a block diagram of the master modem receiver.

Referring now to FIG. 3, there is shown a block diagram for the master modem receiver 80 included in the master modem 12 (FIG. 1). The signal received from the associated transmission line is applied over an input line 82 to an analog-to-digital converter 84 forming digital sampling means. The analog-to-digital converter 84 has an output connected over a line 86 to an interpolation filter 88, the construction and operation of which will be described in more detail hereinafter. The output of the interpolation filter 88 is connected over a line 90 to a band-pass filter 92, an energy on/off control circuit 94, a Discrete Fourier Transform (DFT) calculator 96, and a timing recovery circuit 98. The output of the band-pass filter 92 is connected over line 100 to a demodulator 102, the output of which is connected over a line 104 to a gain control circuit 106. The output of the gain control circuit 106 is connected over a line 108 to an equalizer 110. The output of the equalizer 110 is connected over a line 112 to an automatic phase control circuit 114. The output of the automatic phase control circuit 114 is connected over a line 116 to a decision unit 118, the output of which is connected over a line 120 to a descrambler 122. The output line 124 of the descrambler 122 provides data signals to the data terminal equipment unit 20 (FIG. 1).

The energy on/off control circuit 94 is connected over a line 130 to an initialization control circuit 132. When the energy on/off control circuit 94 detects energy on the line 90, it provides a signal over the line 130 to initiate operation of the initialization control circuit 132. The initialization control circuit 132 provides control signals over control lines 134, 136 and 138 to the gain control circuit 106, the DFT calculator 96 and the timing recovery circuit 98, respectively.

The output of the DFT calculator 96 is connected over a line 140 to a phase segment detector 142, the output of which is connected over a line 143 to a phase-to-time-shift converter 146. The output of the phase-to-time-shift converter 146 is connected over a line 148 to a coefficients calculator 150 which is coupled to the interpolation filter 88 over a line 152 and operates to determine coefficients for the interpolation filter 88 as will be described hereinafter. The timing recovery circuit 98 is connected to the analog-to-digital converter 84 over a line 154. Also included in the master modem receiver 80 is a receiver parameter storage unit 156, which stores values from the equalizer 110, the DFT calculator 96 and the timing recovery circuit 98, over lines 157, 158 and 159 respectively.

Figure 4:
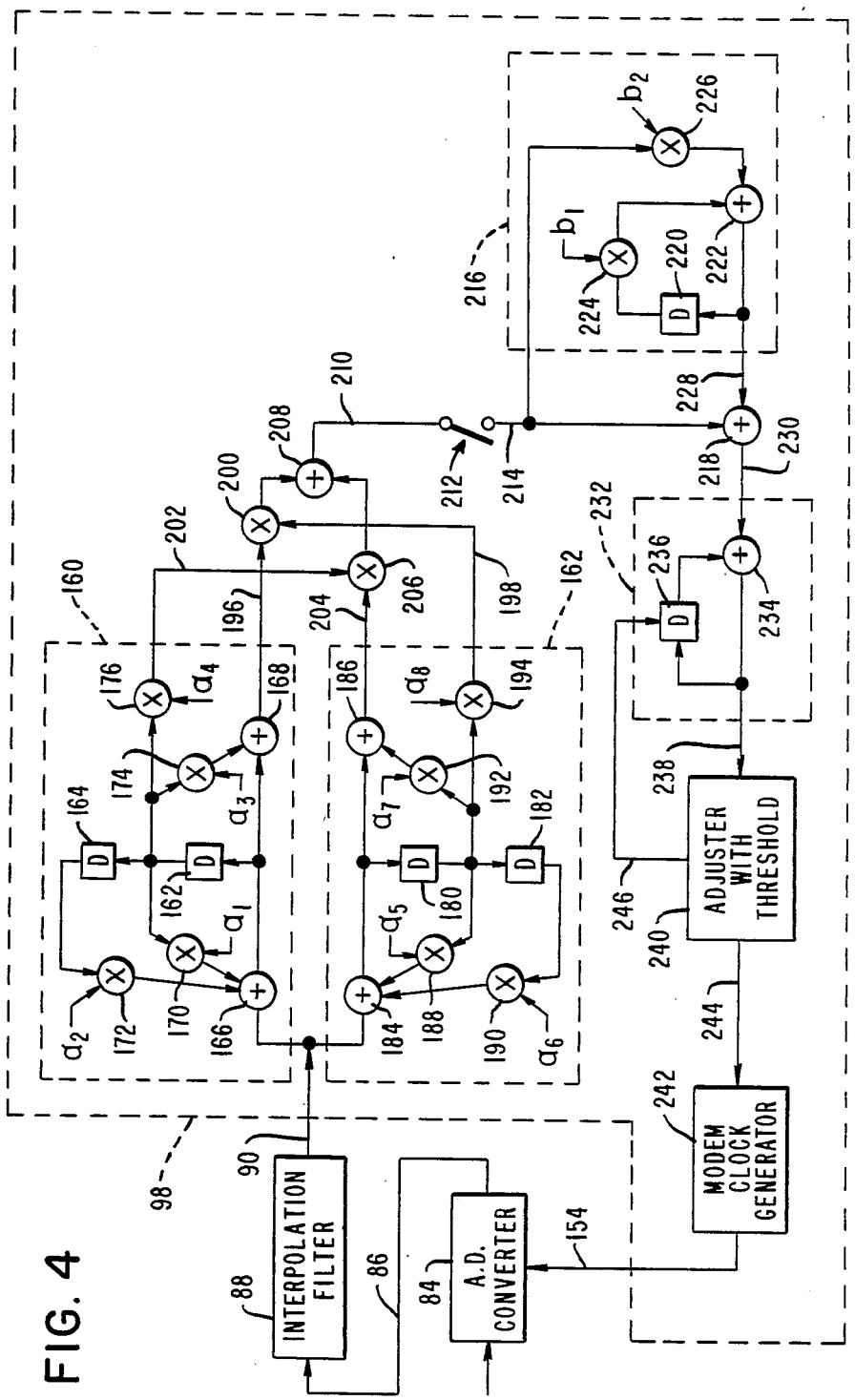
FIG. 4 is a diagram of a timing recovery circuit included in the master modem receiver.

Referring now to FIG. 4, there is shown a more detailed diagram of the timing recovery circuit 98 (FIG. 3) included in the master modem receiver 80. The timing recovery circuit 98 operates as a phase-locked loop (PLL) and includes a 600 Hz band-pass filter 160 and a 3000 Hz band-pass filter 162. These frequencies $f_1 = 600$ Hz and $f_2 = 3000$ Hz are derived from the equation:

$$f_1 = f_c - \tfrac{1}{2} f_b \tag{1a}$$

$$f_2 = f_c + \tfrac{1}{2} f_b \tag{1b}$$

where $f_c = 1800$ Hz, the carrier frequency, and $f_b = 2400$ Hz, the modulation frequency.

The filter 160 includes delays 162 and 164, adders 166 and 168 and multipliers 170, 172, 174 and 176, connected and shown in FIG. 4. The filter 162 includes delays 180 and 182, adders 184 and 186 and multipliers 188, 190, 192 and 194. The multipliers 170, 172, 174, 176, 188, 190, 192 and 194 have the following multiplication coefficients applied thereto:

$a_1 = -1.856$
$a_2 = 0.960$
$a_3 = -0.928$
$a_4 = -0.315$
$a_5 = 0.630$
$a_6 = 0.960$
$a_7 = 0.315$
$a_8 = 0.928$

First outputs 196 and 198 of the filters 160 and 162 are connected to a multiplier 200. Second outputs 202 and 204 of the filters 160 and 162 are connected to a multiplier 206. The outputs of the multipliers 200 and 206 are connected to an adder 208. The output of the adder 208 is connected over a line 210 to a switch 212 which effects a 4 to 1 processing rate reduction between the output line 210 and an output line 214.

The output line 214 of the switch 212 is connected to a leaky integrator circuit 216 and to an adder 218. The leaky integrator circuit 216 includes a delay 220, an adder 222, and multipliers 224 and 226 connected as shown in FIG. 4. The multipliers 224 and 226 have the following coefficients applied thereto:

$b_1 = 0.999$
$b_2 = 0.001$

The output 228 of the leaky integrator 216 is connected to the adder 218. The leaky integrator operates as an integrator provided with a small leakage on its contents, and serves to provide an output signal that approximates the averaged input signal over a time period. The averaging period corresponds to $1/(1-b_1)$ sample intervals. The amplification between input and output corresponds to $b_2/(1-b_1)$. Note that the leaky integrator circuit can be considered as a low-pass filter with a very low cut-off frequency of $(1-b_1)$ times the sample frequency.

The adder 218 is connected over a line 230 to a summer 232 which includes an adder 234 having an output connected to the input of a delay 236, the output of which is connected to an input of the adder 234. The output of the summer 234 increases or decreases when the output of the adder 218 is non-zero (positive or negative, respectively). The output of the summer 232 is connected over a line 238 to an adjuster circuit 240 which compares the output of the summer 232 with a fixed threshold value and adjusts the operation of a modem clock generator circuit 242 over a control line 244 in accordance with the result of the comparison.

The adjuster circuit 240 is also connected over a line 246 to provide a signal which clears the delay 236 in the summer 232. The modem clock generator circuit 242 controls the timing of the sampling instants on the analog-to-digital converter 84 over the line 154.

Figure 5:
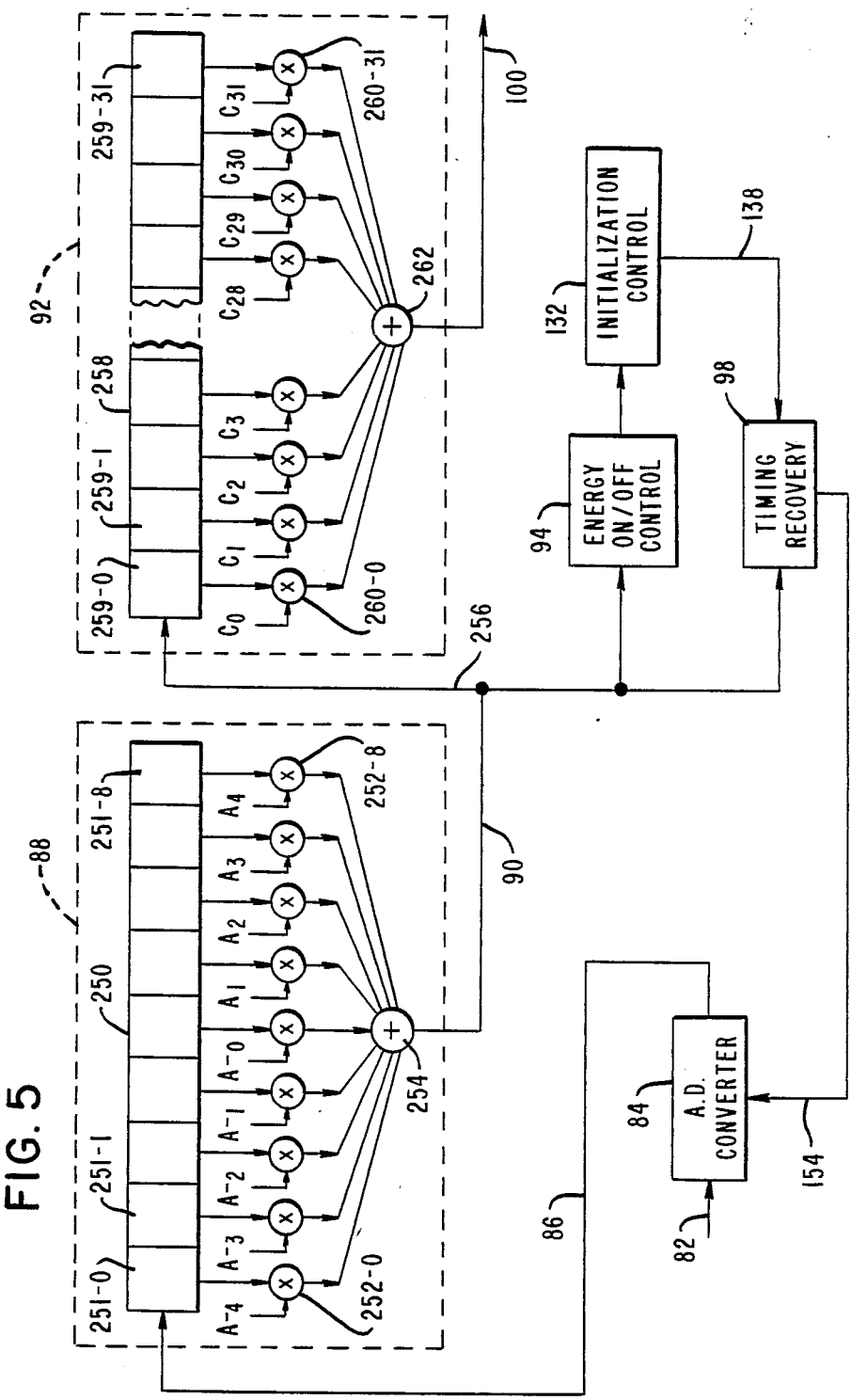
FIG. 5 is a diagram showing an interpolation filter and a band-pass filter included in the master modem receiver.

Referring to FIG. 5, there is shown a more detailed diagram of the interpolation filter 88 and the band-pass filter 92 included in the master modem receiver 80 (FIG. 3). The interpolation filter 88 includes a nine-stage buffer shift register 250 having individual stages 251-0 to 251-8 inclusive. The input line 86 from the A.D. converter 84 is connected to the buffer shift register stage 251-0. Outputs from the buffer shift register stages 251-0 to 251-8 inclusive are connected to respective multipliers 252-0 to 252-8 inclusive, to the other inputs of which are applied filter coefficients $A_{-4}$, $A_{-3}$, $A_{-2}$, $A_{-1}$, $A_0$, $A_1$, $A_2$, $A_3$, $A_4$, which will be discussed hereinafter. The outputs of the multipliers 252-0 to 252-8 inclusive are connected to an adder 254 the output of which is connected to the line 90. In addition to being connected to the energy on/off control circuit 94, and the timing recovery circuit 98, the line 90 is connected over a line 256 to the first stage of a second buffer shift register 258. The buffer shift register 258 includes 32 stages 259-0 to 259-31 inclusive and forms part of the band-pass filter 92. The buffer register stages 259-0 to 259-31 inclusive are connected to respective multipliers 260-0 to 260-31 inclusive which have coefficients $c_0$-$c_{31}$ inclusive applied respectively thereto. The values of these coefficients are selected to provide for the desired band-pass characteristics of the band-pass filter 92. The outputs of the multipliers 260-0 to 260-31 inclusive are connected to an adder 262, the output of which forms the output 100 of the band-pass filter 92.

The operation of the circuitry thus far described will now be explained. The master modem 12 (FIG. 1) polls the remote modems 14, 16 and 18. The master modem 12 continuously transmits a carrier which is received by all the remote modems 14, 16 and 18. One of the remote modems 14, 16 or 18 responds by transmitting information back to the master modem. The particular remote modem 14, 16 or 18 first turns on its carrier and sends a training sequence and data to the master modem 12. The master modem 12 detects the carrier and determines a timing signal for the analog-to-digital converter 84 (FIG. 2), amplifier gain for the gain control circuit 106, and equalizer coefficients for the equalizer 110 (FIG. 3). At the commencement of the first transmission by each of the remote modems 14, 16 and 18 there is transmitted an initial training sequence consisting of six segments $SG_1$-$SG_6$ inclusive, as shown in Table 1.

TABLE 1

|     | Initial Training Sequence | | | | | |
|-----|-----|------|-----|----|----|----|
|     | $SG_1$ | $SG_2$ | $SG_3$ | $SG_4$ | $SG_5$ | $SG_6$ |
| (1) | 256 | 2976 | 128 | 78 | 48 | 48 |
| (2) | 107 | 1240 | 53  | 32 | 20 | 20 |

In Table 1 the first line (1) denotes the number of symbol intervals in the respective segments $SG_1$-$SG_6$ inclusive and the second line (2) denotes the corresponding approximate time in milliseconds. The segments are designated as follows:

$SG_1$: Segment 1: Alternations (180° phase alternations)
$SG_2$: Segment 2: Equalizer Conditioning Pattern
$SG_3$: Segment 3: Configuration Sequence
$SG_4$: Segment 4: Alternations (180° phase alternations)
$SG_5$: Segment 5: Equalizer Conditioning Pattern
$SG_6$: Segment 6: Scrambled All Binary 1's It will be appreciated that the total number of symbol intervals in the initial training sequence is 3534, corresponding to a total time of 1472 milliseconds approximately. Segments $SG_1$, $SG_2$ and $SG_6$ are conventional training signal segments, corresponding with CCITT Recommendation V.33. Segment $SG_3$ contains information relating to set-up conditions such as the data bit rate, the nature of the modulation, and other transmission-related parameters. The Segment $SG_4$ is utilized in calculations related to the timing adjustment, as will be described hereinafter. The Segment $SG_5$ provides a slight re-adjustment of the equalizer coefficients which is needed as a result of transmitting the Segment $SG_3$.

During the initial training sequence, the master modem receiver 80 (FIG. 3) acquires operating parameters and equalizer coefficients and stores these parameters and coefficients in the receiver parameter storage unit 156 (FIG. 3) at a location associated with the transmitting remote modem. Each subsequent transmission by the remote modem commences with a short training signal, referred to as a subsequent training sequence consisting of only one segment, as shown in Table 2:

TABLE 2

|                         | Segment 1 Alternations (180°) | Total |
|-------------------------|-------------------------------|-------|
| No. of Symbol Intervals | 25                            | 25    |
| Approximate time In Milliseconds | 10.4                  | 10.4  |

The remote modem may be identified by transmitting a set of identifying frequencies in synchronism with the subsequent training sequence. Thus, the previously stored receiver parameters and coefficients can be retrieved from the identified location in the receiver parameter storage unit 156. The very brief signal period (10.4 milliseconds in the preferred embodiment) is sufficient to adjust the receiver timing control, as will be more fully explained hereinafter.

Figure 6:
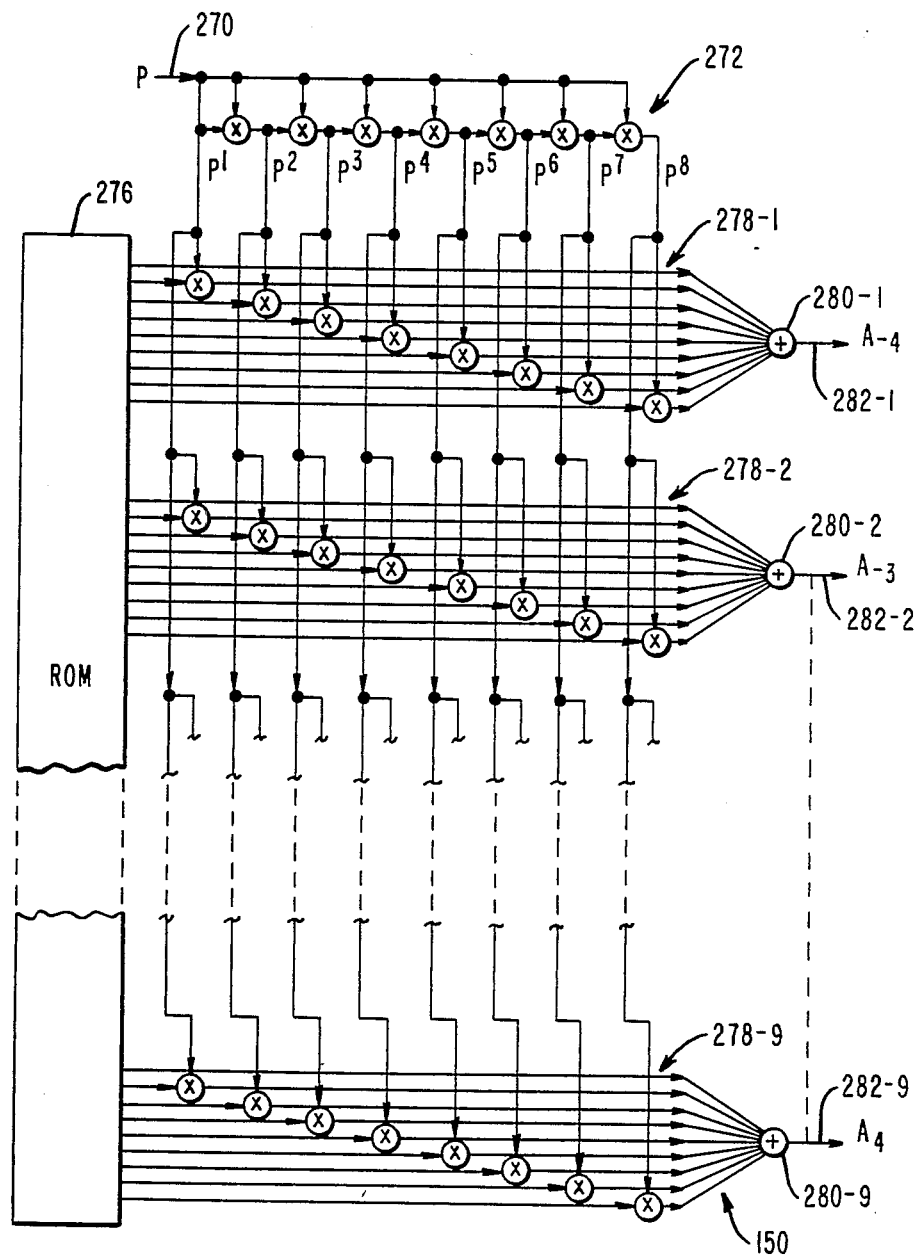
FIG. 6 is a diagram showing a coefficient calculator for the interpolation filter.

Referring to FIG. 6, there in shown in more detail the circuitry included in the coefficients calculator 150 (FIG. 3), which calculates the filter coefficients $A_k$ ($k = -4, \ldots, 0, \ldots, +4$) for the interpolation filter 88. The interpolation filter 88 is based on a 9th order Lagrange interpolation formula and utilizes a residual time shift value p (to be explained). Thus, the interpolation filter output sample $s_{o,n}$ is derived from the formula:

$$s_{o,n} = A_{-4}(p) \cdot s_{i,n-4} + \ldots + A_0(p) s_{i,n} + \ldots + A_4(p) \cdot s_{i,n+4} \tag{2}$$

where
$s_{i,n}$ = n'th input sample
$s_{o,n}$ = n'th output sample
p = residual time shift
$k = -4, \ldots, 0, \ldots, +4$ and $$A_k(p) = \frac{(-1)^k p(p^2 - 1)(p^2 - 4)(p^2 - 9)(p^2 - 16)}{(4 + k)!(4 - k)!(p - k)} \tag{3}$$

The residual time shift value p, is applied to an input line 270 (FIG. 6) which is connected to multipliers 272 which generate successive powers $p^2$, $p^3$, ..., $p^8$. The read-only memory locations are connected as shown in FIG. 6 to nine banks of multipliers 278-1 to 278-9 inclusive which are connected to nine adders 280-1, 280-2, .

..., 280-9 the outputs of which provide nine respective filter coefficient values $A_{-4}$, $A_{-3}$, ..., $A_4$ on output lines 282-1, 282-2, ..., 282-9 which are coupled to the interpolations filter multipliers 252-0 to 252-8 inclusive (FIG. 5).

As mentioned previously, during the first transmission from a remote modem, the initial training sequence shown in Table 1 is transmitted. During this initial training sequence a complex-valued vector $V_i$ is calculated in the DFT calculator 96 (FIG. 3), and stored in the receiver parameter storage unit 156. More precisely, during segment SG4 of the initial training sequence, the following calculations are made:

$$V_{i,600} = \frac{1}{N} \sum_{n=0}^{N-1} s_i \cdot \exp(-j2\pi(n/9600).600) \quad (4)$$

$$V_{i,3000} = \frac{1}{N} \sum_{n=0}^{N-1} s_i \cdot \exp(-j2\pi(n/9600).3000) \quad (5)$$

with successive receiver samples $s_i$ and with $N=192$. These two results are multiplied to form $$V_i = V_{i,3000} \cdot V^*_{i,600} \quad (6)$$

where $V^*_{i,600}$ is the complex conjugate of $V_{i,600}$. $V_i$ is then stored as a receiver parameter in the receiver parameter storage unit 156. Also stored in the receiver parameter storage unit 156 at this time as a receiver parameter is a value g which is formed by the contents of the delay 220 in the leaky integrator 216 (FIG. 4).

During subsequent training, the receiver parameter $V_i$ is used to bring the sample-clock timing to a state matched to the time when the equalizer coefficients are stored in the receiver parameter storage unit 156. More precisely, during subsequent training, a timing adjustment $T_1$ seconds is provided, with $$T_1 = T_2 + T_3 \quad (7)$$

In equation (7), $T_3$ represents a timing compensation (in seconds) for the timing offset between the data timing clock in the relevant remote modems 14, 16 and 18 and the data timing clock in the master modem 12.

The contribution $T_3$ is calculated during the period extending from the mid-point to the end of the Discrete Fourier Transform calculations, in accordance with the formula:

$$T_3 = 6 \cdot g \cdot (0.002/2400) \quad (8)$$

wherein g is the stored parameter retrieved from the receiver parameter storage unit 156 and the factor 0.002/2400 represents the timing shift that can be applied in the modem clock generator 242 (FIG. 4) during a single symbol interval.

The contribution $T_2$ is calculated from the equation:

$$T_2 = \frac{1}{2400} \cdot \frac{1}{2\pi} [Avg(V_i) - Avg(V_s)] \quad (9)$$

$$= \frac{1}{2400} \cdot \frac{1}{2\pi} Avg(V_i \cdot V^*_s)$$

wherein $V_i$ is the vector value which was stored in the storage unit 156 and $V_s$ is calculated during subsequent training in the DFT calculator 96 over a total of 48 samples. More precisely, there are first calculated:

$$V_{s,600} = \frac{1}{N} \sum_{n=0}^{N-1} s_s \exp(-j \cdot 2\pi(n/9600).600)$$

$$V_{s,3000} = \frac{1}{N} \sum_{n=0}^{N-1} s_s \exp(-j \cdot 2\pi(n/9600).3000)$$

with successive receiver samples $s_s$ and with $N=48$. These two results are then multiplied to form:

$$V_s = V_{s,3000} \cdot V^*_{s,600} \quad (10)$$

where $V^*_{s,600}$ is the complex conjugate of $V_{s,600}$.

Using the calculated value of $V_s$ and the value of $V_i$ retrieved from the storage unit 156, $T_2$ is calculated using the equation (9). For achieving accurate timing control, the correct sample for synchronization is selected by rotation of the vector product $V_i \cdot V^*_s$ through a number l of segments to provide a result vector having a phase angle between $-45°$ and $+45°$. This is effected in the phase segment detector 142.

Figure 7:
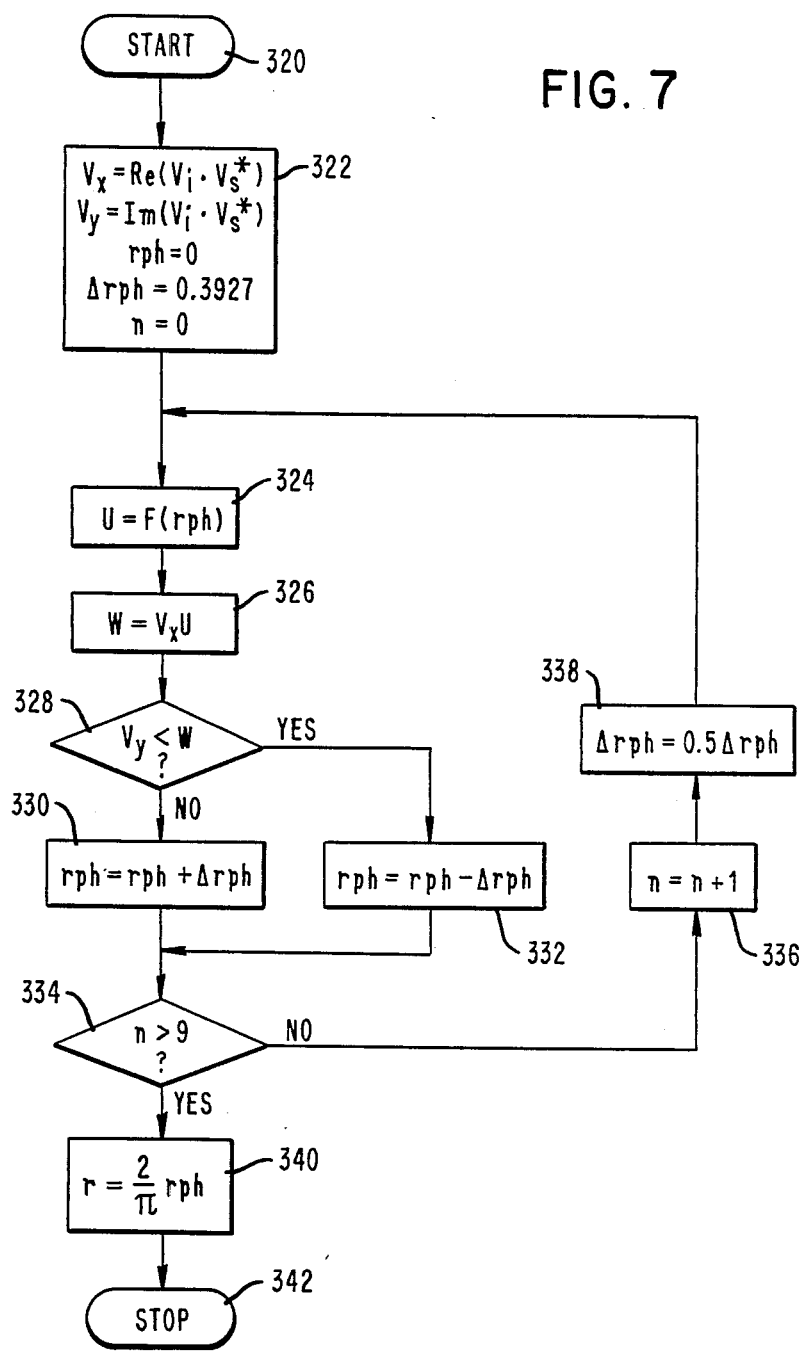
FIG. 7 is a flowchart showing the calculation of a residual time shift value.
Figure 8:
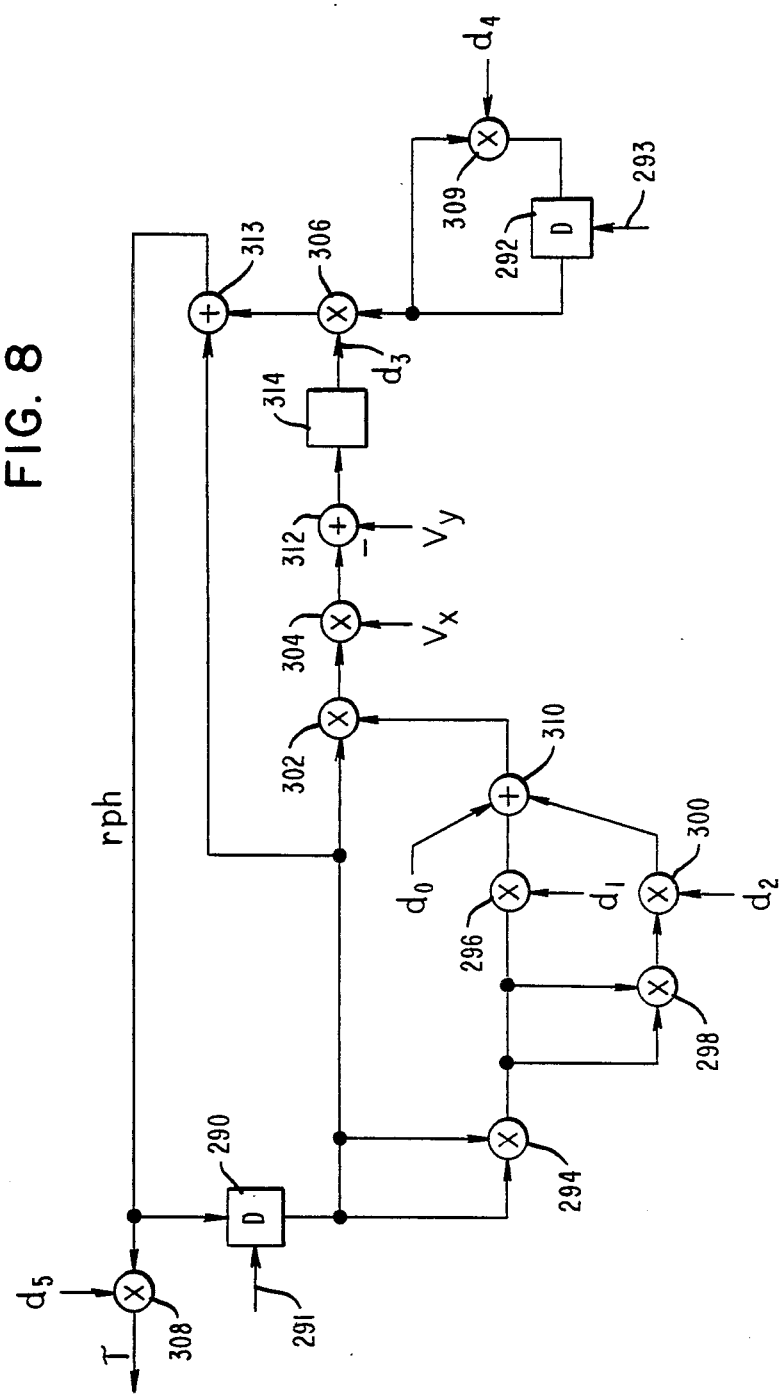
FIG. 8 shows a circuit for calculating the residual time shift value.

Next, the phase rph of the result vector located between $-45°$ and $+45°$ is derived in accordance with the flowchart shown in FIG. 7 and using the circuitry shown in FIG. 8, which is included in the phase-to-time-shift converter circuit 146 (FIG. 3).

Referring now to FIG. 8, the circuit for calculating the result vector phase includes delays 290 and 292 which are initially loaded with the values 0 (zero) and 0.3927 over lines 291 and 293, respectively. Also included in the circuit are multipliers 294, 296, 298, 300, 302, 304, 306, 308 and 309, and adders 310, 312 and 313 with the adder 312 functioning as a subtractor and having an output connected to a comparator 314.

Certain circuit elements shown in FIG. 8 have constant values applied thereto as follows:

Adder 310: $d_0=1$
Multiplier 296: $d_1=0.31755$
Multiplier 300: $d_2=0.20330$
Multiplier 306: $d_3=-1$ or $+1$ (output of comparator 314)
Multiplier 309: $d_4=0.5$
Multiplier 308: $d_5=0.63602$ ($=2/\pi$)

Also, the multiplier 304 has the value $V_x$ applied thereto and the adder 312 has the value $V_y$ applied thereto. It should be understood that $V_x$ and $V_y$ are the real and imaginary parts of the vector product $V_i \cdot V^*_s$. The output of the adder 312 is connected to the comparator 314 which provides an output signal $d_3=-1$ or $+1$ according as $V_y < W$ or $V_y > W$.

Referring now to the flowchart shown in FIG. 7, the procedure commences at a start block 320. Next, in block 322 the procedure sets:

$V_x = Re(V_i \cdot V^*_s)$
$V_y = Im(V_i \cdot V^*_s)$
rph$=0$
$\Delta$rph$=0.3927$
$n=0$ where Re and Im represent the real and imaginary parts, respectively, and rph represents the phase in radians of the result vector $V=(V_x, V_y)$, and n represents a counter value which determines the length of the procedure.

In block 324 there is effected the calculation:

$$U = F(rph) = rph + 0.31755(rph)^3 + 0.20330(rph)^5 \quad (11)$$

Equation (11) is a known approximation for the function $F(rph) = \tan(rph)$. This calculation is effected using the circuit elements 296, 293, 300 and 310 (FIG. 8). Next, in block 326, the product $W = V_x \cdot U$ is calculated (in multiplier 304, FIG. 8). Then, in block 328, there is a determination made as to whether $V_y < W$. If no, then the procedure moves to block 330, wherein rph is incremented by $\Delta rph$. If yes, then the procedure moves to block 332 wherein rph is decremented by $\Delta rph$. Then, in block 334 a determination is made as to whether $n > 9$. If no, then the procedure moves to block 336 where n is replaced by $n+1$, then to block 338 where $\Delta rph$ is replaced by $0.5\, \Delta rph$ (in multiplier 309, FIG. 8) and then back to block 324. If the determination made in block 334 is yes, then the procedure moves to block 340 where the calculation $r = (2/\pi) \cdot rph$ is effected (in multiplier 308, FIG. 8). The procedure then terminates as is shown in block 342. Thus, a residual time shift value r has been calculated.

Equation (7) defines the timing adjustment T1 as an absolute time value in seconds. However, it is desirable to rewrite equation (7) as follows:

$$p_1 = p_2 + p_3 \qquad (12)$$

Here, $p_2$ and $p_3$ represent time shift contributions in fractions of a sample interval, the sum value $p_1$ also representing a sample interval fraction. Thus, the contribution $p_2$ is formed by the residual time shift value r, calculated as described above, in fractions of a sample intervals. More precisely, $$p_2 = r \; (-0.5 \leq r < 0.5) \qquad (13)$$

Furthermore, since $$p_3 \cdot (1/9600) = T_3$$

Then, using equation (8), $$p_3 = 6 \cdot g \cdot (0.002/2400)$$

or $p_3 = 0.048\, g \qquad (14)$

During any initial or subsequent trainings before the loading of the interpolation filter 88 (FIG. 3) with calculated coefficients, the interpolation filter operates with coefficients $A_{-4} = 1$ and $A_{-3} = A_{-2} = \ldots = A_4 = 0$. The value of p is then calculated as:

$p = p_1 - 1$ if $p_1 > 0.19$ $p = p_1$ if $p_1 < 0.19$

The derivation of p in accordance with the above calculation is effected in the phase-to-time-shift converter 146 (FIG. 3).

The value of p, calculated as described above, is used in the coefficients calculator 150 to calculate the coefficients $A_k(p)$ ($k = -4, \ldots, 0, \ldots, +4$) for the interpolation filter 88 during any subsequent training sequences. However, during the initial training sequence, a compromise time shift $p^*$ is used to calculate the interpolation filter coefficients. The application of a compromise time shift $p^*$ during initial training provides an improvement for subsequent training. The derivation of the compromise time shift $p^*$ will now be explained.

It should be appreciated that amplitude distortion introduced by the interpolation filter 88 is independent of the sign of p. Therefore, a compromise time shift $p^*$ based on minimum amplitude distortion is about 0.25. However, the interpolation filter 88 also introduces delay distortion. The interpolation filter 88 has a non-linear phase characteristic depending on the time shift value p. An experimental effort was made to determine the optimum compromise time shift $p^*$ relating to degradation during subsequent training. The degradation in the signal at the end of the signal path through the telephone transmission line, the interpolation filter 88 and the equalizer 110 was measured for a large number of alternatives, and an optimum compromise time shift $p^* = -0.19$ was determined. This value $p^* = -0.19$ is utilized in the circuit of FIG. 6 for the calculation of the interpolation filter coefficients during the initial training sequence.

As mentioned previously, it has been found that the application of a compromise time shift $p^*$ during initial training improves the performance during subsequent training. Thus, without the application of a time shift during initial training it is found that the disturbance during a subsequent training sequence is better than 36 dB below the signal level. With a time shift value of $P = -0.25$ the disturbance is better than 39 dB and at the compromise time shift $p^* = -0.19$, the disturbance is better than 41 dB.

Thus, a compromise time shift $p^* = -0.19$ is applied during the initial training sequence. During this initial training sequence, equalizer coefficients are acquired which take account of the additional distortion introduced by the interpolation filter 88 at the compromise time shift of $p^* = -0.19$. As previously discussed, these equalizer coefficients are stored in the receiver parameter storage unit 156, and are accessed in response to a subsequent training sequence, during which a residual time shift p is developed as described hereinabove.

It will be appreciated that the master modem receiver 80 described herein enables fast and accurate synchronization to be achieved during a very short training period (e.g. 10.4 milliseconds) with a very high data transmission rate (14,400 bits per second). A further advantage is that since the interpolation operation is applied to signal samples already received and stored in the stages of the buffer shift register 258 (FIG. 5), signal samples received prior to completion of a subsequent initialization operation do not have to be discarded, but instead, can contribute to an earlier valid operation of the bandpass filter 92. Furthermore, the time that the master modem receiver needs to synchronize in proportion to the total transmission time, is reduced.

We claim:

1. A multipoint data modem communication system having a master modem coupled over a transmission line to a plurality of remote modems including:
    a modem receiver mounted in said master modem;
    sampling means mounted in said modem receiver adapted to receive analog signals from the transmission line;
    timing recovery means mounted in the modem receiver for supplying timing signals to said sampling means;
    interpolation filter means in said modem receiver having an input coupled to an output of said sampling means and an output coupled to an input of said timing recovery means; and
    filter coefficient calculation means mounted in said modem receiver, coupled to said interpolation filter means, and adapted to calculate, in accordance with a predetermined interpolation formula, filter coefficients for said interpolation filter means during the reception by said receiver means of a training signal transmitted by one of said remote modems.

2. A multipoint data modem communication system according to claim 1 wherein said filter coefficient calculation means utilizes a Lagrange interpolation formula.

3. A multipoint data modem communication system according to claim 2 in which said modem receiver includes a plurality of first multipliers and in which said interpolation filter means includes a plurality of first buffer shift register stages having outputs coupled to said multipliers to which said filter coefficients are applied.

4. A multipoint data modem communication system according to claim 3 in which said modem receiver includes a band-pass filter means whose output is connected to a data signal development means and in which the output of said interpolation filter means is coupled to the band-pass filter means for developing data signals.

5. A multipoint data modem communication system according to claim 4 in which said modem receiver further includes a second multiplier and said band-pass filter means includes a plurality of second buffer shift register stages having outputs coupled to said further multipliers to which band-pass filter coefficients are applied.

6. A multipoint data modem communication system according to claim 2, wherein said Lagrange interpolation formula corresponds to a ninth order interpolation, and wherein $$A_k(p) = \frac{(-1)^k p(p^2 - 1)(p^2 - 4)(p^2 - 9)(p^2 - 16)}{(4 + k)!(4 - k)!(p - k)}$$

where $K = -4, \ldots, 0, \ldots, +4$, where $A_k(p)$ represents the value of k'th one of said interpolation filter coefficients; and where p is a time shift value.

7. A multipoint data modem communication system according to claim 6, wherein said filter coefficient calculation means includes Discrete Fourier Transform (DFT) calculation means adapted to effect Discrete Fourier Transform calculations, a phase segment detector coupled to said DFT calculation means and adapted to detect the phase value of the output of said DFT calculations means and phase-to-time-shift conversion means coupled to an output of said phase-to-time-shift conversion means and adapted to calculate said time shift value p.

* * * * *

UNITED STATES PATENT AND TRADEMARK OFFICE
CERTIFICATE OF CORRECTION

PATENT NO. : 4,847,880

DATED : July 11, 1989

INVENTOR(S) : Adriaan Kamerman et al.

It is certified that error appears in the above-identified patent and that said Letters Patent is hereby corrected as shown below:

Column 8, line 50, delete "$V_y < W$ or $V_y > W$" and substitute --$V_y < W$ or $V_y \geq W$--.

Column 9, line 32, delete "$P2=r(-0.5 \leq r < 0.5)$" and substitute --$P2=r(-0.5 \leq r < 0.5)$--.

Column 9, line 51, delete "$P=P1$ if $P1 < 0.19$" and substitute --$P=P1$ if $P1 \leq 0.19$--.

Signed and Sealed this

Fifteenth Day of May, 1990

*Attest:*

HARRY F. MANBECK, JR.

*Attesting Officer*     *Commissioner of Patents and Trademarks*